United States Patent [19]

Fistner, Sr.

[11] Patent Number: 6,039,797
[45] Date of Patent: Mar. 21, 2000

[54] WASHABLE MARKING COMPOSITION

[75] Inventor: David C. Fistner, Sr., Bethlehem, Pa.

[73] Assignee: Binney & Smith Inc., Easton, Pa.

[21] Appl. No.: 09/240,622

[22] Filed: Feb. 1, 1999

[51] Int. Cl.[7] .................................................. C09D 11/00
[52] U.S. Cl. ................................... 106/31.64; 106/31.09; 106/31.66
[58] Field of Search ............................... 106/31.09, 31.1, 106/31.64, 31.66, 504

[56] References Cited

U.S. PATENT DOCUMENTS

| | | | |
|---|---|---|---|
| 3,409,574 | 11/1968 | Gros | 260/23 |
| 3,933,708 | 1/1976 | Brinkman | 260/23 H |
| 3,957,408 | 5/1976 | Clymer et al. | 425/144 |
| 3,957,495 | 5/1976 | Teranishi et al. | 106/19 |
| 3,993,492 | 11/1976 | Woolly | 106/19 |
| 4,082,491 | 4/1978 | Clymer et al. | 425/440 |
| 4,212,786 | 7/1980 | Murakami | 260/31.2 R |
| 4,741,774 | 5/1988 | Lazar | 106/19 |
| 4,768,987 | 9/1988 | Usui et al. | 446/71 |
| 4,840,669 | 6/1989 | Hughes et al. | 106/19 |
| 4,840,670 | 6/1989 | Hughes et al. | 106/19 |
| 4,859,242 | 8/1989 | Hughes et al. | 106/19 |
| 4,978,390 | 12/1990 | Snedeker | 106/19 |
| 5,055,498 | 10/1991 | Brachman | 523/164 |
| 5,066,216 | 11/1991 | Kowtko et al. | 425/562 |
| 5,084,098 | 1/1992 | Olson | 106/19 |
| 5,084,493 | 1/1992 | Olson et al. | 523/164 |
| 5,116,410 | 5/1992 | Miller | 106/22 |
| 5,261,952 | 11/1993 | Craig | 106/19 B |
| 5,276,075 | 1/1994 | Santini | 524/40 |
| 5,340,386 | 8/1994 | Vincent et al. | 106/31.94 |
| 5,380,357 | 1/1995 | Lytton | 106/19 B |
| 5,383,954 | 1/1995 | Craig | 106/19 B |
| 5,389,717 | 2/1995 | Santini et al. | 524/575 |
| 5,417,746 | 5/1995 | Cheng | 106/19 B |
| 5,453,120 | 9/1995 | Rendino et al. | 106/19 B |
| 5,486,228 | 1/1996 | Miller et al. | 106/22 B |

FOREIGN PATENT DOCUMENTS

| | | |
|---|---|---|
| 210496 | 2/1983 | Czechoslovakia . |
| 51-4128 | 1/1976 | Japan . |
| 52-58621 | 5/1977 | Japan . |
| 024326 | 8/1979 | Japan . |
| 56-59879 | 5/1981 | Japan . |
| 56-34240 | 8/1981 | Japan . |
| 57-92069 | 6/1982 | Japan . |
| 58-162673 | 9/1983 | Japan . |
| 59-96179 | 6/1984 | Japan . |
| 59-176369 | 10/1984 | Japan . |
| 60-23464 | 2/1985 | Japan . |
| 62-121778 | 6/1987 | Japan . |
| 63-57683 | 3/1988 | Japan . |
| 1250166 | 10/1971 | United Kingdom . |
| 1548901 | 7/1979 | United Kingdom . |

*Primary Examiner*—Mark L. Bell
*Assistant Examiner*—Veronica F. Faison
*Attorney, Agent, or Firm*—Leydig, Voit & Mayer, Ltd.

[57] ABSTRACT

The present invention provides a washable marking composition, e.g., a crayon composition, comprising an alkoxylated fatty acid, a fatty alcohol, and a pigment. The marking composition preferably further includes a filler. An example of a preferred alkoxylated fatty acid is ethoxylated stearic acid and an example of a preferred fatty alcohol is stearyl alcohol. The marks made by the composition can be easily washed off surfaces such as fabrics, wallpapers, skin, and painted surfaces. The present invention further provides a method of producing a washable crayon comprising:

(a) providing an alkoxylated fatty acid, a fatty alcohol, and a pigment;

(b) melt-blending said alkoxylated fatty acid, fatty alcohol, and pigment, to provide a melt-blend; and (c) shaping the melt-blend in the form of a crayon.

26 Claims, No Drawings

WASHABLE MARKING COMPOSITION

TECHNICAL FIELD OF THE INVENTION

The present invention relates to marking compositions such as crayons in general, and in particular to marking compositions whose marks can be washed away from surfaces such as fabrics, skin, wallpaper, and painted surfaces with water or soap and water.

BACKGROUND OF THE INVENTION

Washable marking compositions such as crayons have been known. See, for example, U.S. Pat. Nos. 4,212,786, 3,993,492, 4,978,390, and 5,084,098. Some of these compositions contain polyethylene glycol as an ingredient that contributes to the washability of the mark. Thus, for example, the '492 patent discloses a water soluble composition intended for making a variety of articles including crayons, lecture pencils, and the like. The composition contains a pigment, polyethylene glycols of different molecular weights, a non-ionic emulsifier, and a filler.

Although polyethylene glycol has been effective in improving the washability of the marks, some crayons made from such compositions have been found to have some drawbacks. For example, the crayons have diminished mechanical strength such as point strength. Thus, thin crayons, which are ideally suited for use by young children, tend to break rather easily. This reduced mechanical strength precludes the manufacture of thin crayons. Further, it is believed that manufacturers of crayons containing polyethylene glycol experience high reject rates due to the high melt-viscosity of these compositions particularly at low processing temperatures. In addition, flaking and rough writing or absence of smooth laydown are some of the problems encountered with these crayons.

Thus, there exists a need for a washable marking composition that offers a crayon having an enhanced mechanical strength. There further exists a need for a washable marking composition that can be manufactured into crayons more easily, with a reduced reject rate. There further exists a need for a washable marking composition whose crayon flakes less. There further exists a need for a marking composition that has smooth laydown properties.

These and other objects and advantages of the present invention, as well as additional inventive features, will be apparent from the description of the invention provided herein.

SUMMARY OF THE INVENTION

The foregoing needs have been fulfilled to a great extent by the present invention which provides a washable marking composition comprising an alkoxylated fatty acid, a fatty alcohol, and a pigment. The marking composition preferably further includes a filler. The present invention further provides a method of producing a washable crayon comprising:

(a) providing an alkoxylated fatty acid, a fatty alcohol, and a pigment;

(b) melt-blending said alkoxylated fatty acid, fatty alcohol, and pigment, to provide a melt-blend; and (c) shaping the melt-blend in the form of a crayon.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF EMBODIMENTS

The present invention provides a washable marking composition comprising an alkoxylated fatty acid, a fatty alcohol, and a pigment. The marking composition preferably includes a filler. The marking composition of the present invention offers washable crayons having one or more advantageous properties including excellent washability, improved mechanical strength, smooth laydown, reduced flaking and ease of manufacturing. A detailed description of the washable marking composition is set forth below.

It has been discovered that the excellent properties can be advantageously realized if the composition is carefully chosen from among alkoxylated fatty acids, fatty alcohols, and pigments. It has been particularly found that by a careful choice of the alkoxylated fatty acid and fatty alcohol one or more advantageous properties of the marking composition can be obtained. And, preferably, by keeping the composition free or substantially free of polyethylene glycol, the drawbacks associated with some of the crayons can be minimized or eliminated.

Although any suitable alkoxylated fatty acid can be used, ethoxylated fatty acids are preferred. Alkoxylated fatty acids can be prepared, for example, by the reaction of a suitable alkylene oxide and a suitable fatty acid in the presence of a suitable catalyst, or they can be obtained from commercial polymer houses, e.g., Lipo Chemicals, Inc. in Paterson, N.J., and Lambent Technologies, Inc. in Norcross, Ga. Alternatively, a fatty acid can be esterified with a polyalkylene glycol such as polyethylene glycol, using known esterification catalysts such as mineral acids.

A preferred ethoxylated fatty acid has the following formula: $CH_3(CH_2)_nC(=O)(OCH_2CH_2)_mOH$, wherein n and m are integers, n can be from about 5 to about 25, preferably from about 10 to about 20, and more preferably from about 15 to about 17, and m can be from about 10 to about 200, preferably from about 50 to about 150, and more preferably from about 75 to about 125. A particular example of an ethoxylated fatty acid is ethoxylated stearic acid. A further preferred example is an ethoxylated fatty acid wherein n is 16 and m is about 100.

The alkoxylated fatty acid imparts mechanical strength to the marking composition; the alkoxylated fatty acid also provides a melt-blend of the marking composition that has a low viscosity. The low viscosity allows molding of crayons with fewer rejects or bad points at low processing temperatures. The alkoxylated fatty acid can be present in the marking composition in an amount of from about 25% to about 75%, and preferably from about 35% to about 55% by weight of the marking composition. If the alkoxylated fatty acid is used in excess, the crayon produced therefrom would be too slippery and the laydown would be adversely effected. If the alkoxylated fatty acid is insufficient, a reduction in mechanical strength would result along with an increase in drag.

The marking composition of the present invention includes a fatty alcohol, preferably a fatty alcohol that is miscible with water. Examples of fatty alcohols include stearyl alcohol, cetyl alcohol, and glyceryl monostearate. A preferred fatty alcohol is stearyl alcohol. Stearyl alcohol is a low cost water miscible filler. The fatty alcohol can be present in the marking composition in an amount of from about 25% to about 75%, and preferably from about 35% to about 55% by weight of the marking composition. If the fatty alcohol is used in excess, it would weaken the crayon and increase drag on laydown. If the fatty alcohol content is too low, the crayon would be too slippery.

The marking composition of the present invention preferably includes a filler. Any suitable solid filler can be used. An example of a suitable filler is NYTAL™ 400, which is an inexpensive filler available from R. T. Vanderbilt Co. Inc. in Norwalk, Conn.

The filler can be present in the marking composition in an amount of from about 5% to about 50%, and preferably from about 10% to about 30% by weight of the marking composition. If the filler is used in excess, the resulting crayon would be too hard and brittle. If the filler is insufficient, the strength of the crayon would weaken.

The marking composition of the present invention includes a pigment, preferably ones that tend to be washable or that are treated to enhance washability. Examples of such treated pigments include extended pigments, e.g., pigments extended on clay. Preferred pigments include AAA pigments, for example, acetoacetanilide pigments. The pigment can be present in the marking composition in an amount of from about 1% to about 20%, and preferably from about 0.5% to about 7.5% by weight of the marking composition. If the pigment level is excessive, the pigment does not wash out readily, and, if the pigment level is low, the color intensity of the mark would be weak.

The marking composition of the present invention preferably includes a defoamer to prevent entrainment of air in the crayon matrix during its manufacture. Any suitable defoamer can be used, for example, FOAMKILL™ 614, which is a petroleum hydrocarbon based defoamer available from Crucible Chemical Co. in Greenville, S.C. The defoamer can be present in the marking composition in an amount of up to about 2%, and preferably from about 0.2% to about 0.5% by weight of the marking composition. If the defoamer is used excessively, the application properties of the crayon, such as mechanical strength and laydown, may be adversely affected.

The marking composition of the present invention has several advantages. For example, crayons can be manufactured with low reject rates, for example below 1.5% and preferably in the range of 0.5 to 1%. The low reject rates are possible due to the low melt-blend viscosity. For example, at 190°F. and 50 rpm on the Brookfield DV-II+Viscometer the melt-blend viscosity is 9.0 centipoises, and at 225°F. the viscosity is 1.0 centipoise. The lower melt-blend viscosity of the composition makes it possible to mold the smaller 8-size stick. Certain polyethylene glycol based formulas tend to be too viscous to effectively form good points and the reject rates are unacceptably high. The mechanical strength of such polyethylene glycol based formulas is too weak to form a small crayon. The mechanical strength of the present invention is close to that of the paraffin/stearic crayon which is available as an 8-size crayon commercially.

Crayons made from the marking composition of the present invention have great mechanical strength. Thus, it is possible to manufacture thin crayons, e.g., crayons of an 8-size (3⅝"×⁵⁄₁₆"), which is difficult to prepare with certain previously known compositions. Crayons prepared with the marking composition showed point breaking strength of about 4.3 to about 4.8 pounds. To measure the point breaking strength, the crayon samples were conditioned at 72±1 degree Fahrenheit for at least 30 minutes before testing. Using the Chatillon DFIS-10 digital force gauge, the crayon was placed in a jig to hold the crayon at approximately a 25–30 degree angle. The jig was then raised by an electric motor until the crayon tip broke. The breaking strength was then read off the gauge.

Crayons of the marking composition of the present invention flake less. Flaking is the generation of small particles or flakes as the crayon is being used. Flaking contributes to messiness during coloring and is an undesirable feature of a crayon. The excellent flaking values of four different colored washable crayons of the present invention are set forth below.

| Color | Wt % flaking |
|---|---|
| Yellow | 0.87 |
| Orange | 1.72 |
| Red | 3.38 |
| Brown | 2.92 |

The flaking data set forth above were obtained on a crayon rubout machine. An ordinary plain paper was placed on the paper holder and clamped into place. The crayon was clamped in a jig and an 800 gram weight was applied. The paper holder was moved back and forth while the crayon jig traversed the paper to make a square that was approximately 1¾ per side. A second pass was made over top of the first pass. The resulting flakes were collected in an aluminum pan using a brush. The flakes were weighed and this weight was recorded. The crayon was weighed before and after the two-pass rubout was made. The weight of the flakes was divided by the total weight loss of the crayon and the result was the Wt. % flaking.

The marking composition of the present invention has excellent laydown property. Laydown refers to the feel of a crayon as color is being applied. A soft, waxy crayon may yield resistance to movement across the paper. This condition manifests itself as a characteristic known as drag. As a result, the crayon does not glide smoothly across the surface of the paper. Some of the previously known crayons exhibit this poor dragging type of laydown. The crayons of the present invention, in contrast, provide smoother writing. Thus, the laydown characteristic resembles that of a paraffin/stearic crayon. Paraffin/stearic crayons are not washable although they have excellent laydown characteristics. On a laydown scale of 1 to 5, 1 being that of certain known washable crayons and 5 being that of the paraffin/stearic crayon, crayons of the present invention rate about 4.

The present invention further provides a method of producing a washable crayon comprising:

(a) providing an alkoxylated fatty acid, a fatty alcohol, and a pigment;

(b) melt-blending the alkoxylated fatty acid, fatty alcohol, and pigment to provide a melt-blend; and (c) shaping the melt-blend in the form of a crayon.

Thus, a mixture of alkoxylated fatty acid, fatty alcohol, and pigment, and optionally a filler is blended in a suitable equipment to obtain a melt-blend. The melt-blend can be molded into crayons by methods known to those of ordinary skill in the art, for example, the melt-mixture can be gravity fed or poured into crayon molds; alternatively, the melt-blend can be produced in an extruder, and shaped into crayons by injection molding.

The following illustrative example further illustrates the present invention but, of course, should not be construed as in any way limiting its scope.

EXAMPLE

This Example illustrates the preparation of a marking composition of the present invention. Crayons (33-size 4"×7¹⁄₁₆") were prepared by gravity molding a mixture containing the following ingredients.

| Ingredients | Wt % |
|---|---|
| Ethoxylated stearic acid | 42.6 |
| Stearyl alcohol | 42.6 |
| Foamkill 614 | 0.3 |
| NYTAL 400 | 12.0 |
| Pigment | 2.5 |

The crayons obtained had excellent washability. Crayon marks were made on various surfaces by applying 5 hand strokes on top of each other. The crayon marks were easily washed off painted tile boards having two coats of flat white paint thereon. A wet paper towel was employed to wipe off the marks. The marks wiped off completely as determined visually. The crayon marks were similarly washed off wallpaper. Crayon marks on fabrics, 100% cotton and 50/50 cotton/polyester, were washed off in a clothes washing machine using TIDE™ powder detergent with a hot water wash. The fabrics were dried under the normal drying setting. The marks were removed completely, as determined visually. No residual stain was observed on all substrates tested above.

All patents cited herein are hereby incorporated in their entirety by reference.

While this invention has been described with an emphasis upon several embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. A washable marking composition comprising an alkoxylated fatty acid, a fatty alcohol, and a pigment.

2. The washable marking composition of claim 1, wherein said composition is substantially free of polyethylene glycol.

3. The washable marking composition of claim 2, which further includes a filler.

4. The washable marking composition of claim 3, wherein said alkoxylated fatty acid is an ethoxylated fatty acid.

5. The washable marking composition of claim 4, wherein said ethoxylated fatty acid is an ethoxylated stearic acid.

6. the washable marking composition of claim 1, wherein said fatty alcohol is selected from the group consisting of stearyl alcohol, cetyl alcohol, and glyceryl monostearate.

7. The washable marking composition of claim 5, wherein said fatty alcohol is selected from the group consisting of stearyl alcohol, cetyl alcohol, and glyceryl monostearate.

8. The washable marking composition of claim 6, wherein said fatty alcohol is stearyl alcohol.

9. The washable marking composition of claim 7, wherein said fatty alcohol is stearyl alcohol.

10. The washable marking composition of claim 9, wherein said ethoxylated fatty acid is present in an amount of from about 25% to about 75% by weight of the marking composition.

11. The washable marking composition of claim 10, wherein said fatty alcohol is present in an amount of from about 25% to about 75% by weight of the marking composition.

12. A washable marking composition comprising an ethoxylated stearic acid, stearyl alcohol, and a pigment.

13. The washable marking composition of claim 12, wherein said composition is substantially free of polyethylene glycol.

14. The washable marking composition of claim 13, which further includes a filler.

15. The washable marking composition of claim 14, which further includes a defoamer.

16. The washable marking composition of claim 14, wherein said ethoxylated stearic acid is present in an amount of from about 25% to about 75% by weight, said stearyl alcohol is present in an amount of from about 25% to about 75% by weight, said filler is present in an amount of from about 10% to about 30% by weight, and said pigment is present in an amount of from about 0.5% to about 7.5% by weight of the marking composition.

17. A method of producing a washable crayon comprising:

(a) providing an alkoxylated fatty acid, a fatty alcohol, and a pigment;

(b) melt-blending said alkoxylated fatty acid, fatty alcohol, and pigment, to provide a melt-blend; and (c) shaping said melt-blend in the form of a crayon.

18. The method of claim 17, wherein said crayon is substantially free of polyethylene glycol.

19. The method of claim 18, which further includes providing a filler in step (a) and melt-blending said filler in step (b).

20. The method of claim 18, wherein said melt-blending is carried out in an extruder.

21. The method of claim 18, wherein said shaping is carried out by injection molding.

22. The method of claim 17, wherein said alkoxylated fatty acid is an ethoxylated fatty acid.

23. The method of claim 17, wherein said fatty alcohol is selected from the group consisting of stearyl alcohol, cetyl alcohol, and glyceryl monostearate.

24. The method of claim 23, wherein said fatty alcohol is stearyl alcohol.

25. The method of claim 19, wherein said filler is a talc.

26. The method of claim 22, wherein said ethoxylated fatty acid is an ethoxylated stearic acid.

* * * * *